United States Patent
Minnick

(10) Patent No.: US 7,370,352 B2
(45) Date of Patent: May 6, 2008

(54) TECHNIQUES FOR STORING AND RETRIEVING SECURITY INFORMATION CORRESPONDING TO CRYPTOGRAPHIC OPERATIONS TO SUPPORT CRYPTOGRAPHIC PROCESSING FOR MULTIPLE NETWORK TRAFFIC STREAMS

(75) Inventor: Linden Minnick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 903 days.

(21) Appl. No.: 09/948,464

(22) Filed: Sep. 6, 2001

(65) Prior Publication Data

US 2003/0046585 A1   Mar. 6, 2003

(51) Int. Cl.
*G06F 21/00* (2006.01)
(52) U.S. Cl. ............... 726/11; 726/13; 726/14; 713/160; 713/162; 718/105
(58) Field of Classification Search ........... 713/155, 713/201, 153, 193, 151, 160, 162; 380/37, 380/259; 726/11, 13, 14; 718/105
See application file for complete search history.

(56) References Cited

U.S. PATENT DOCUMENTS

| | | | |
|---|---|---|---|
| 5,727,149 A | | 3/1998 | Hirata et al. |
| 5,983,350 A | * | 11/1999 | Minear et al. ............... 726/11 |
| 6,697,857 B1 | * | 2/2004 | Dixon et al. ............... 709/224 |
| 6,754,832 B1 | * | 6/2004 | Godwin et al. ............... 726/14 |
| 6,772,348 B1 | * | 8/2004 | Ye ............................. 713/201 |
| 7,194,766 B2 | * | 3/2007 | Noehring et al. ............. 726/13 |
| 2002/0062333 A1 | * | 5/2002 | Anand et al. ............... 709/105 |
| 2003/0005279 A1 | * | 1/2003 | Valenci et al. ............... 713/150 |
| 2003/0018908 A1 | * | 1/2003 | Mercer et al. ............... 713/193 |

FOREIGN PATENT DOCUMENTS

| | | |
|---|---|---|
| EP | 0 772 131 A2 | 5/1997 |
| EP | 1 079 581 A2 | 2/2001 |
| WO | WO 01/05086 A2 | 1/2001 |
| WO | WO 01/39538 A1 | 5/2001 |

OTHER PUBLICATIONS

S. Kent, R. Atkinson: "RFC 2401: Security Architecture for the Internet Protocol," RFC Request for Comments, Nov. 1998, pp. 1-66, XP002218816, Retrieved from the internet on Oct. 29, 2002, <URL:http://www.ietf.org/rfc/rfc2401.txt?number=2401>.

* cited by examiner

*Primary Examiner*—Kambiz Zand
*Assistant Examiner*—Tongoc Tran
(74) *Attorney, Agent, or Firm*—Blakely, Sokoloff, Taylor & Zafman LLP

(57) ABSTRACT

A Security Association (SA) lookup table is maintained at a network interface. The SA data is stored in a memory external to the network interface, for example, in the memory of a host electronic system in which the network interface provides network access. The lookup table stores sufficient information for the network interface, or another system component, to access the SA data. When a cryptography operation is to be performed, the SA data is retrieved from the external memory and delivered to the processor performing the cryptographic operations. In one embodiment, destination Internet Protocol (IP) address and the IPSec protocol are checked after the SA data is retrieved from the external memory. In one embodiment, the lookup table entries contain only an offset value from a base address value to locate the SA data.

34 Claims, 5 Drawing Sheets

TECHNIQUES FOR STORING AND RETRIEVING SECURITY INFORMATION CORRESPONDING TO CRYPTOGRAPHIC OPERATIONS TO SUPPORT CRYPTOGRAPHIC PROCESSING FOR MULTIPLE NETWORK TRAFFIC STREAMS

FIELD

The present invention relates to performing cryptography operations on data streams. More particularly, the present invention relates to IP security offload.

BACKGROUND

The IP Security (IPSec) standard provides techniques for protecting both confidentiality and integrity of data transferred over a network. IPSec is described in IP Security Internet Engineering Task Force (IETF) Request for Comments (RFC) 2401, published November 1998. Because IPSec provides a way to encrypt and decrypt data below the Transmission Control Protocol (TCP)/User Datagram Protocol (UDP) layer, the protection is transparent to applications that transfer data. Thus, a system may utilize IPSec without requiring changes at the application level. However, the algorithms used for cryptography (crypto) operations (e.g., encryption, decryption, authentication) on the data for IPSec require many processor cycles to execute. The processor cycles spent on crypto operations decrease the cycles available to applications and other parts of the protocol stack. This in turn decreases throughput in the system.

One solution to this problem is to offload the cryptography operations to hardware external to the processor, for example, a network interface card (NIC). One offload technique is to decrypt the data directly off the network connection before the packet is transferred to host memory. Often, data transfers between the NIC and host memory are accomplished using a direct memory access (DMA) device. The process of decrypting and authenticating ingress data before it is transferred to host memory is referred to as "Inline Receive."

An alternative to Inline Receive is a technique referred to as "Secondary Use," which uses an out-of-band acceleration technique to decrypt receive packets. All packets received from the network are transferred to host memory via DMA transfer. The network driver then parses each received packet to match it with a corresponding security association (SA). A security association is a data structure that contains information necessary to encrypt, decrypt and or authenticate a packet of data.

Assuming the cryptographic operation processor in located on the NIC, the driver must instruct the NIC processor to transfer the packet across the bus, perform the cryptographic operation on the packet and then send the packet back across the bus to host memory. The result is that the packet is transferred across the bus three times, which is an inefficient use of host resources. The Secondary Use technique further introduces latency that can degrade throughput of protocols that are sensitive to round trip timing delays, for example, TCP.

Inline Receive provides better overall performance as compared to Secondary Use at the expense of increased complexity and expense of the network interface. One of the factors that results in increased expense is that, for Inline Receive, the network interface generally stores the SAs for the incoming data streams. In order to support a large number of incoming data streams, the network interface would then store a large number of SAs, which are generally stored in a cache memory on the network interface. Increasing this cache size increases the expense of the network interface.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for offloading cryptographic processing for multiple network streams are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In one embodiment, a Security Association (SA) lookup table is maintained at a network interface. The SAs are stored in a memory external to the network interface, for example, in the memory of a host electronic system in which the network interface provides network access. The lookup table stores sufficient information (e.g., a unique key and the location of the SA data or a base address and an offset) for the network interface control circuitry, or another system component, to retrieve the SA and use the SA for cryptography operations.

When a cryptography operation is to be performed, the SA data is retrieved from the external memory and delivered to the component performing the cryptographic operations. The IPSec standard requires that the destination Internet Protocol (IP) address and the IPSec protocol be checked in order to guarantee a match. In one embodiment, these values are checked after the SA data is retrieved from the external memory. Thus, in one embodiment, the lookup table entries contain only the SPI and sufficient addressing information to access the SA in the external memory.

Figure 1:
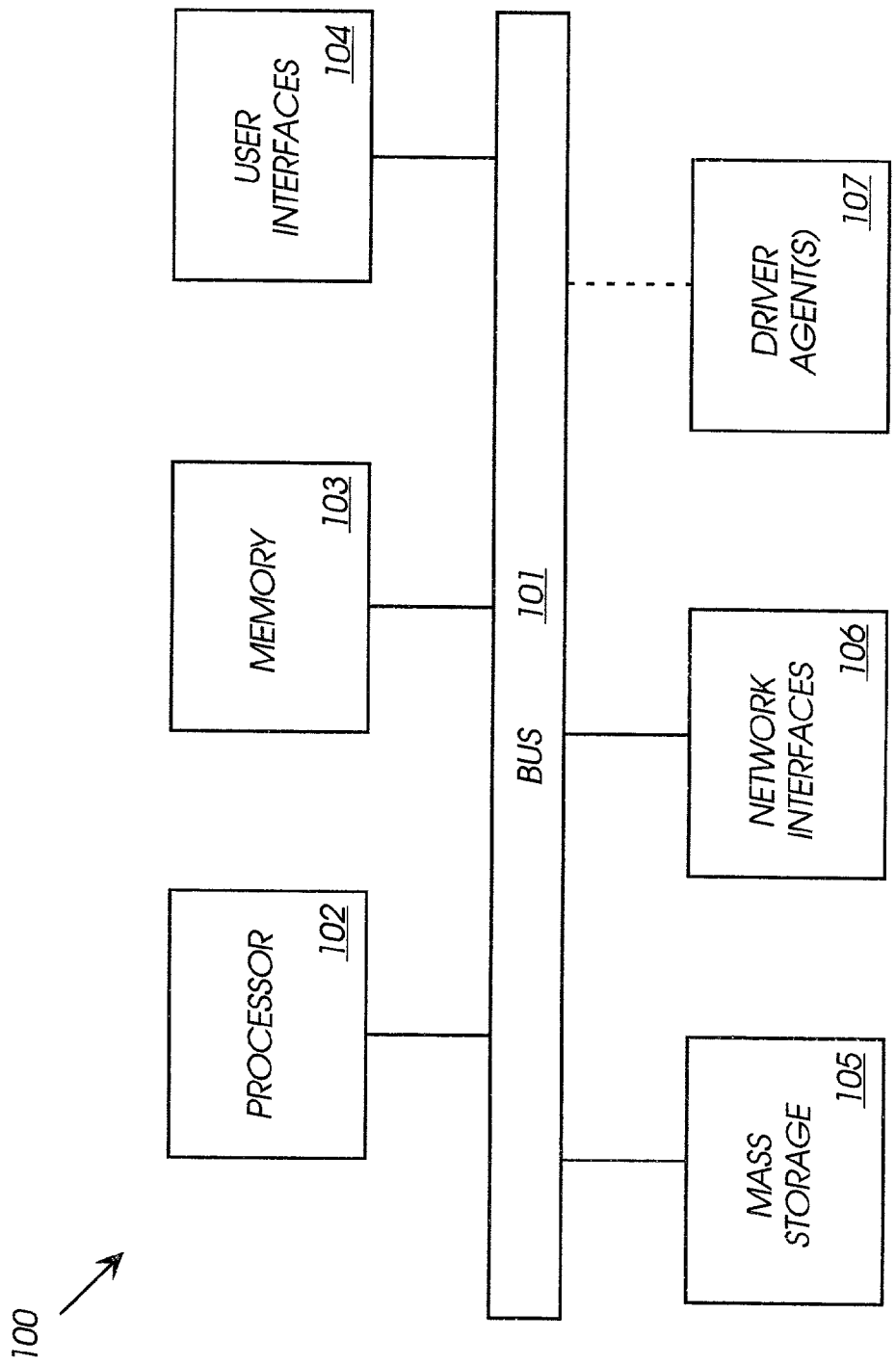
FIG. 1 is one embodiment of a block diagram of an electronic system.

FIG. 1 is one embodiment of an electronic system. Electronic system 100 may be, for example, a computer, a Personal Digital Assistant (PDA), a set top box, or any other electronic system having access to a network. System 100 includes bus 101 or other communication device to communicate information, and processor 102 coupled with bus 101 to process information and to execute instructions. System 100 further includes memory 103, coupled to bus 101 to store information and instructions to be executed by processor 102. Memory 103 may also be used to store temporary variables or other intermediate information during execution of instructions by processor 102. Memory 103 may include random access memory (RAM), read-only memory (ROM), flash, or other static or dynamic storage media.

User interfaces 104 are coupled to bus 101 to allow interaction with a user. Mass storage 105 can be coupled to system 100 to provide instructions to memory 103. Mass storage 105 can be, for example, a magnetic disk or optical disc and its corresponding drive, a memory card, or another device capable of storing machine-readable instructions. Network interfaces 106 can be coupled to bus 101 to enable system 100 to communicate with other electronic systems via a network. Driver agent 107 may be coupled to system 100 to perform driver features in hardware. Driver agent 107 may be an Application Specific Integrated Circuit (ASIC), a special function controller or processor, a Field Programmable Gate Array (FPGA), or other hardware device to perform the functions of a driver. Driver agent 107 is not a necessary part of system 100.

Instructions can be provided to memory 103 from a storage device, such as magnetic disk, CD-ROM, DVD, via a remote connection (e.g., over a network), etc. In alternative embodiments, hard-wired circuitry can be used in place of or in combination with software instructions. Instructions can be provided to memory 103 from a form of machine-accessible medium. A machine-accessible medium includes any mechanism that provides (i.e., stores) information in a form readable by a machine (e.g., a computer). For example, a machine-accessible medium includes read only memory (ROM); random access memory (RAM); magnetic disk storage media; optical storage media; flash memory devices; etc.

Figure 2:
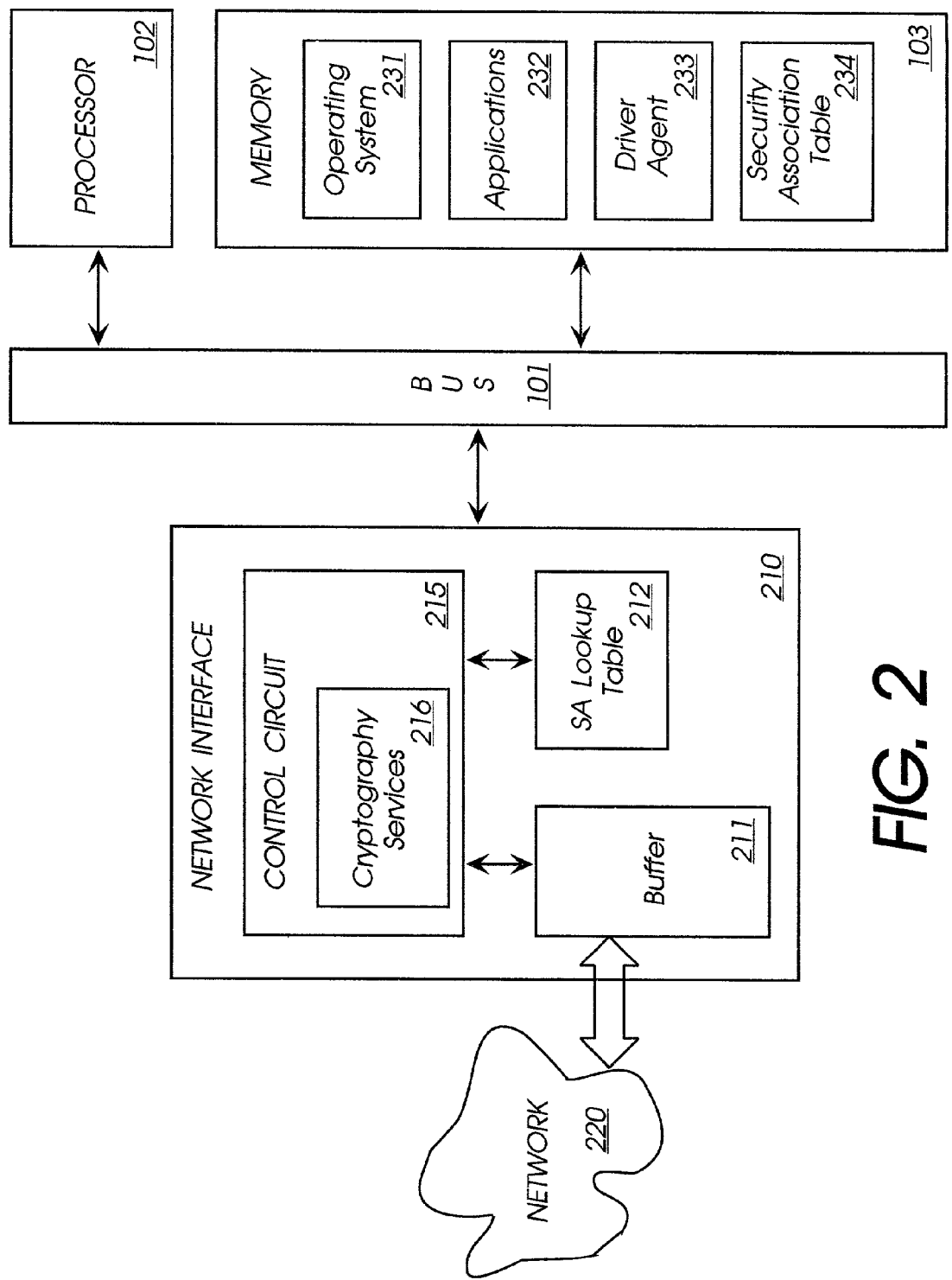
FIG. 2 is one embodiment of a block diagram of a network interface coupled to a network.

FIG. 2 is one embodiment of a block diagram of a network interface coupled to a network. In one embodiment, Network Interface (NI) 210 is a communication interface that enables an electronic system to communicate with other electronic systems coupled to network 220. For example, NI 210 can be a Network Interface Card (NIC). In one embodiment, traffic streams are received from network 220 into buffer 211 on NI 210.

Network interface 210 further includes control circuit 215 which provides cryptography services 216 and is coupled to buffer 211 and SA lookup table 212. Control circuit 215 can be, for example, hardwired circuitry, an application specific integrated circuit (ASIC), a field programmable gate array (FPGA), a general purpose processor or controller circuit or any other type of logic circuit. Portions of the functionality of control circuit 215 can also be provided as sequences of instructions that are executed by circuit elements. Cryptography services 216 provide cryptography operations (e.g., encryption, decryption, authentication) and can be implemented in any manner known in the art as any combination of hardware and software.

SA lookup table 212 stores information indicating memory locations for SAs. Because SA lookup table 212 stores only the memory location for SAs, the number of SAs that can be supported by network interface 210 is increased as compared to the same sized memory used for a cache of SA data. control circuit 215 retrieves SAs from security association table 234 in memory 103 based in information retrieved from SA lookup table 212.

Memory 103 contains operating system (OS) 231 which controls the flow of instructions to processor 102. In one embodiment, OS 231 is the highest layer of control of the electronic system. Driver agent 233 is a lower layer of system control. Driver agent 233 is used to control operation of network interface 210. Applications 232 can contain programs (e.g., word processor(s); electronic mail (e-mail) programs) that can be executed by electronic system 100. Memory 103 also contains SA table 234 that is a data structure of SAs. In one embodiment, control circuit 215 accesses SA table 234 to retrieve SA data for use in performing cryptographic operations.

Figure 3:
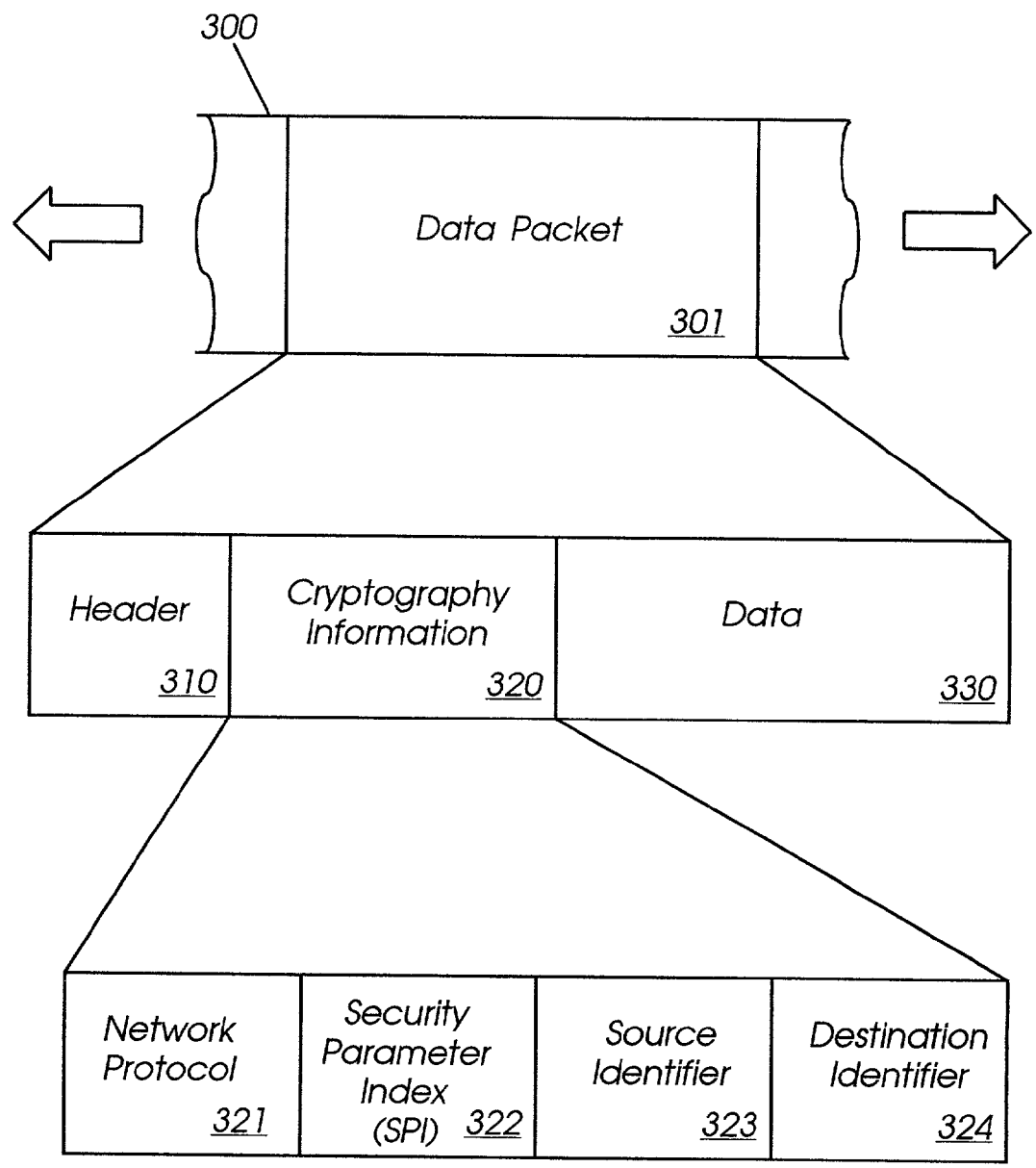
FIG. 3 is one embodiment of a block diagram of a data packet.

FIG. 3 is one embodiment of a block diagram of a data packet. In one embodiment, data packet 301 is embodied in traffic stream 300. For example, traffic stream 300 can be a secure traffic stream used by multiple networked electronic systems to communicate. For example, traffic stream 300 may be a network traffic stream between two electronic systems using the IPSec encryption standard to transfer secure information over the Internet.

In one embodiment, data packet 301 consists of header 310, cryptography information 320, and data 330. In one embodiment, cryptography information 320 consists of network protocol 321, security parameter index (SPI) 322, source identifier 323, and destination identifier 324. Network protocol 321, SPI 322, source identifier 323, and destination identifier 324 can exist independently of and be external to cryptography information 320. Thus, cryptography information may be more or less complex, consisting of some, all, or additional elements to those depicted in FIG. 3.

In one embodiment, cryptography information 320 is necessary for an electronic system to process data packet 301. For example, an electronic system receiving data packet 301 using IPSec will locate cryptography information 320 to authenticate the packet and determine how to decrypt data 330.

Figure 4:
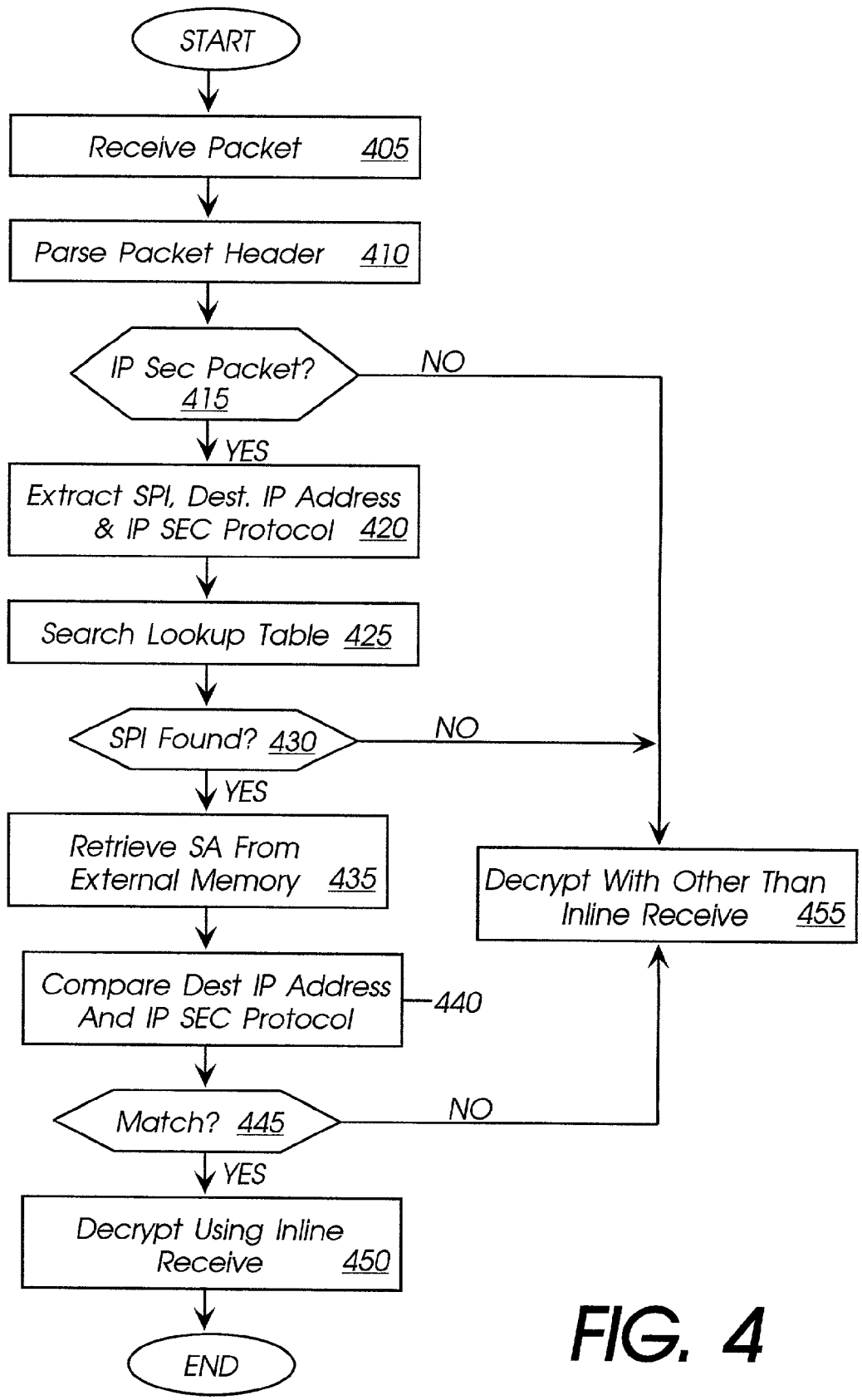
FIG. 4 is a flow diagram of one embodiment of a technique for performing cryptographic operations on a packet of data received via a network connection.

FIG. 4 is a flow diagram of one embodiment of a technique for performing cryptographic operations on a packet of data received via a network connection. The process flow of FIG. 4 is described in terms of an IPSec protocol; however, other protocols can also be used.

A network packet is received at 405. For example, a network packet can be received via a network interface and stored in a buffer on a network interface card. The packet can be stored in the buffer until the network processor, or other processing device, retrieves the packet from the buffer.

The network packet header is parsed at 410. The non-payload portions of the network packet are analyzed to determine various characteristics of the network packet. Header information can include, for example, a source address, a destination address, an SPI, one or more protocol type, etc. When decrypting an IPSec packet, the header information is used to determine whether a packet that has been received is an IPSec packet.

In one embodiment, if the packet is not an IPSec packet at 415, the packet is not decrypted by the network interface using a SA retrieved from external memory, 455. If the packet is an IPSec packet at 415, the network processor, or other processing device, extracts the SPI, the destination address and the IPSec protocol used to encrypt the packet.

The information extracted by the network processor is used to search an SA lookup table on the network interface at 425. In IPSec implementations, the SPI of received packets is unique and can be used as a key to search the SA lookup table. The entry in the SA lookup table provides information about the location of the SA in a memory that is external to the network interface. The external memory can be, for example, a main memory of a computer system having a network interface card that provides the SA lookup table. Similarly, any electronic system (e.g., computer, set top box, personal digital assistant, cellular telephone) having a network interface, either wired or wireless, can provide SA lookup information and the SA information in separate memory locations.

In one embodiment, the network interface is 64-bit compliant, which means that the address of the SAs can be anywhere in a 64-bit address space. In one embodiment, in order to avoid using 8 bytes (64 bits) per lookup table entry, the SA lookup table stores a base address and an offset for each entry.

Several alternative embodiments exist for implementation of the offset. In one embodiment, the SAs have a variable size and the size of each SA is defined. If, for example, 5,000 SAs are supported, 19 bits are provided for offset and 8 bits are provided for the size (assuming that the maximum size is 128 bytes). Thus, the total entry size is 27 bits.

In an alternative embodiment, if the SAs are fixed in size, then only an "SA Index" is required. Support for 64 k SAs would result in 16 bits used for offset. Assuming fixed SA size the external memory is not optimally used if the SAs are not actually fixed in size; however, the lookup memory size is reduced as compared to supporting variable SA sizes. Generally, the external memory is less expensive than the memory used to provide the SA lookup table. Therefore, assuming a fixed SA size can provide a more efficient implementation than assuming a variable SA size.

While memory addressing, the SA lookup table entries, and SAs have been described in terms of specific bit sizes, the techniques described herein can be applied to any bit sizes. For example, 128-bit addressing could be supported. SA lookup table offset values could be greater than 16 bits. Other bit size changes can be supported as well. One embodiment, for providing a base address and an offset value as the SA lookup table entry is described in greater detail below.

If an entry in the SA lookup table corresponding to the SPI of the received packet is not found at 430, the packet is not decrypted by the network interface using a SA retrieved from an external memory, 455. If an entry is the SA lookup table corresponding to the SPI of the received packet is found at 430, an SA is retrieved from the external memory at 435.

The destination IP address and the IPSec protocol retrieved from the packet header is compared to the SA at 435. If the destination IP address and the IPSec protocol do not match at 445, the packet is not decrypted at the network interface using a SA retrieved from external memory, 455. If the destination IP address and the IPSec protocol match at 445, the packet is decrypted by the network interface using a SA retrieved from an external memory at 450.

Figure 5:
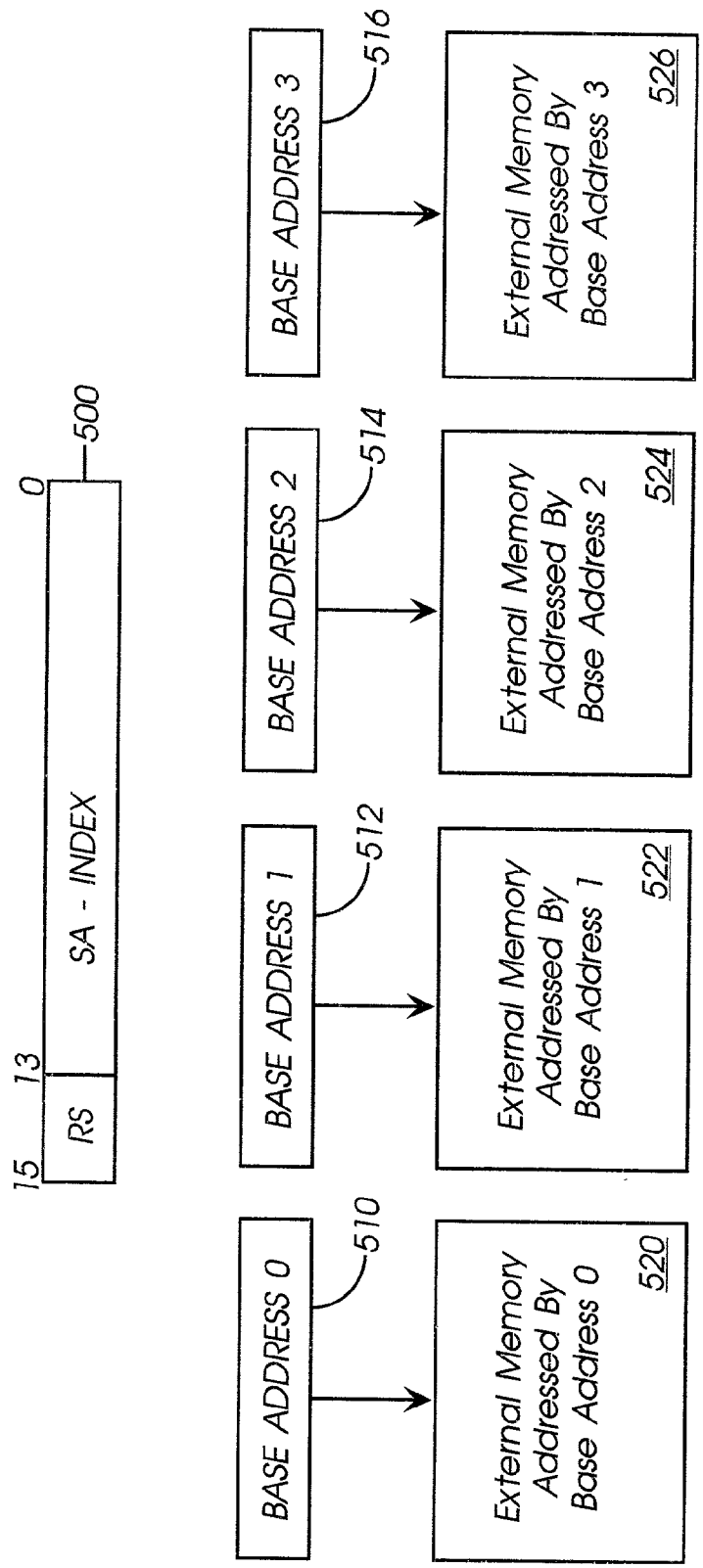
FIG. 5 illustrates one embodiment of base address and offset addressing technique for retrieving SAs from external memory.

FIG. 5 illustrates one embodiment of base address and offset addressing technique for retrieving SAs from external memory. The SA lookup table entry of FIG. 5 is a 16-bit value; however, any lookup table entry size can be used. Also, FIG. 5 is described in terms of having four base address registers; however, any number of base address registers can be supported. In one embodiment, the number of base address registers is a power of two (e.g., 2, 4, 8, 16).

Entry 500 represents a sample SA lookup table entry. Entry 500 has two fields, a register select (RS) field and an index (SA_INDEX) field. The RS field is used to determine which of multiple base address registers (e.g., 510, 512, 514, 516) provide a base address in the external memory to address a block of SAs stored in the external memory. One advantage provided by the use of base address registers and index values is that the block of locations in the external memory that are used to store the SAs need not be contiguous for all of the SAs. This is beneficial when large numbers of SAs must be supported as it can be difficult for a network driver to allocate large amounts of physically contiguous memory.

The SA_INDEX field in entry 500 provides an offset from the base address provided by the appropriate base address register. In one embodiment, the offset is provided in terms of SAs. In other words, assuming a 128 byte SA, each increment of index values represents an 128-byte block of memory.

Base address registers 510, 512, 514 and 516 store an address corresponding to an associated block of memory, memory 520, 522, 524 and 526, respectively. In one embodiment, each block of memory is in a main memory of a host electronic system; however, the blocks of memory can be in other types of memory, for example, a flash memory. The blocks of memory can also be in different memory systems, for example, some base addresses can be in main memory of the host system and other base addresses can be in other memory systems.

For example, if the RS field of entry 500 contains a "11" binary, the address in base address register 516 is used to address a block of external memory. Base address registers 510, 512, 514 and 516 can be hardware registers on the network interface, or the base address registers can be memory locations in a memory on the network interface, or the base address registers can be registers and/or memory locations within the host electronic system.

Base address register 516 stores a pointer to (or the beginning address of) external memory block 526. The SA_INDEX field of entry 500 indicates an offset from the base address stored in base address register 516. The memory location indicated by combination of the base address and the offset value is the memory location of the SA corresponding to SA lookup table entry 500. The SA can be retrieved by the network interface processor for use in performing cryptographic operations.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   storing lookup information corresponding to a plurality of security associations (SAs) for multiple network streams internal to a network interface, the lookup information to identify locations of the SAs in an external memory external to the network interface, wherein the external memory is a host memory of a host system for the network interface;
   storing the SAs in the external memory; and
   retrieving selected SAs from the external memory based on the corresponding lookup information for use in cryptographic operations by an internal component of the network interface.

2. The method of claim 1 wherein the lookup information comprises a base address and a plurality of offset values from the base address for each of the corresponding SAs stored in the external memory.

3. The method of claim 1 wherein the lookup information is searched based on a Security Parameter Index (SPI).

4. The method of claim 1 the external memory comprises one or more portions of a memory system of the host system.

5. The method of claim 4 wherein the host system comprises a computer system coupled to a network.

6. The method of claim 1 wherein the network interface comprises a network interface card (NIC) coupled between a bus of the host system and a network.

7. The method of claim 1, wherein the lookup information comprises a plurality of entries each corresponding to one of the plurality of SAs stored in the external memory, wherein each of the entries comprises:
a register select ("RS") field storing a value referencing one of a plurality of base address buffers storing base addresses of locations of the plurality of SAs stored in the external memory; and
an SA index field storing an offset value from the corresponding one of the base addresses.

8. The method of claim 7, wherein the base address buffers are maintained internal to the network interface.

9. The method of claim 8, wherein the base address buffers are registers of the network interface.

10. An article comprising a computer-readable medium to provide instructions that, when executed by one or more processors, cause one or more electronic devices to:
store lookup information corresponding to a plurality of security associations (SAs) for multiple network streams at a network interface, the lookup information to identify locations of the SAs in an external memory external to the network interface, wherein the external memory is a host memory of a host system for the network interface;
store the SAs in the external memory; and
retrieve selected SAs from the external memory based on the corresponding lookup information for use in cryptographic operations by an internal component of the network interface.

11. The article of claim 10 wherein the lookup information comprises a base address and a plurality of offset values from the base address for each of the corresponding SAs stored in the external memory.

12. The article of claim 10 wherein the lookup information is searched based on a Security Parameter Index (SPI).

13. The article of claim 10 wherein the external memory comprises one or more portions of a memory system of the host system.

14. The article of claim 13 wherein the host system comprises a computer system coupled to a network.

15. The article of claim 10 wherein the network interface comprises a network interface card (NIC) coupled between a bus of a host electronic system and a network.

16. A method comprising:
receiving a network packet from a network stream at a network interface card, the network stream being received from a remote electronic system over a network; and
retrieving a security association (SA) corresponding to the network stream from an external memory external to the network interface card receiving the network stream based on lookup information stored internal to the network interface, wherein the external memory comprises a host memory of a host system to the network interface.

17. The method of claim 16, wherein receiving the network packet comprises receiving the network packet from an operating system.

18. The method of claim 16, wherein receiving the network packet comprises receiving the network packet from a network.

19. The method of claim 16 wherein the lookup information comprises a base address and a plurality of offset values from the base address for each of the corresponding SAs stored in the external memory.

20. The method of claim 19 wherein the lookup information is searched based on a Security Parameter Index (SPI).

21. The method of claim 16 wherein the external memory comprises one or more portions of a memory system of the host system.

22. The method of claim 21 wherein the host system comprises a computer system coupled to a network.

23. The method of claim 16 wherein the network interface comprises a network interface card (NIC) coupled between a bus of the host system and the network.

24. An article comprising a computer-readable medium to provide instructions that, when executed by one or more processors, cause one or more electronic devices to:
receive a network packet from a network stream at a network interface card, the network stream being received from a remote electronic system over a network; and
retrieve a security association (SA) corresponding to the network stream from an external memory external to network interface card receiving the network stream based on lookup information stored internal to the network interface, wherein the external memory comprises a host memory of a host system to the network interface.

25. The article of claim 24, wherein the sequences of instructions that cause the one or more electronic devices to receive the network packet comprises instructions that, when executed by the one or more processors, cause the one or more electronic devices to receive the network packet from an operating system.

26. The article of claim 24, wherein the sequences of instructions that cause the one or more electronic devices to receive the network packet comprises instructions that, when executed by the one or more processors, cause the one or more electronic devices to receive the network packet from a network.

27. The article of claim 24 wherein the lookup information comprises a base address and a plurality of offset values from the base address for each of the corresponding SAs stored in the external memory.

28. The article of claim 24 wherein the lookup information is searched based on a Security Parameter Index (SPI).

29. The article of claim 24 wherein the external memory comprises one or more portions of a memory system of the host system.

30. The article of claim 24 wherein the network interface comprises a network interface card (NIC) coupled between a bus of the host system and the network.

31. An apparatus comprising:
a network interface to receive signals propagated across a network that represent a packet of data;
a buffer internal to the network interface, the buffer to store the packet of data;
a control circuit internal to the network interface and coupled to the buffer, the control circuit to retrieve information from the packet of data; and
a cache memory internal to the network interface and coupled to the control circuit, the cache memory to store lookup information identifying a memory location in an external memory external to the network interface within a host system in which a security association (SA) corresponding to the packet of data is stored, a location of the lookup information stored in the cache memory being identified by the information retrieved from the packet of data;

wherein the control circuit retrieves the SA from the external memory based on the identifying information stored in the cache memory.

32. The apparatus of claim 31 wherein the lookup information comprises a base address and an offset value.

33. The apparatus of claim 31 wherein the lookup information comprises searched based on a Security Parameter Index (SPI).

34. The apparatus of claim 31 wherein the external memory comprises one or more portions of a memory system of the host system.

* * * * *